US005165827A

United States Patent [19]

Miller

[11] Patent Number: 5,165,827

[45] Date of Patent: Nov. 24, 1992

[54] MULTI-USE TOOL GUIDE

[76] Inventor: Bernard Miller, 5600 Munhall Rd., Pittsburgh, Pa. 15217

[21] Appl. No.: 681,315

[22] Filed: Apr. 8, 1991

Related U.S. Application Data

[63] Continuation-in-part of Ser. No. 346,903, May 2, 1989, Pat. No. 5,006,022.

[51] Int. Cl.[5] ........ B23B 49/00

[52] U.S. Cl. ........ 408/16; 408/110; 408/712

[58] Field of Search ........ 408/14, 712, 110–112, 408/16, 76, 95, 87; 409/182; 173/170; 144/104, 106, 83, 134 D

[56] References Cited

U.S. PATENT DOCUMENTS

| | | | |
|---|---|---|---|
| 88,821 | 4/1869 | Sweet | 408/16 X |
| 2,768,663 | 10/1956 | Jones | 408/112 |
| 2,849,900 | 9/1958 | Heidtman | 408/112 |
| 2,883,891 | 4/1959 | Shulters et al. | 408/112 |
| 2,896,677 | 7/1959 | Payzant | 408/112 |
| 3,096,798 | 7/1963 | Pugsley | 408/110 X |
| 3,141,360 | 7/1964 | Wolf | 408/110 |
| 3,890,058 | 6/1975 | Self et al. | 408/112 |
| 4,684,303 | 8/1987 | Erdt et al. | 408/712 X |
| 4,729,698 | 3/1988 | Haddon | 408/110 |
| 4,765,786 | 8/1988 | Krogh | 408/110 |

*Primary Examiner*—Larry I. Schwartz
*Assistant Examiner*—Robert Schultz
*Attorney, Agent, or Firm*—Clyde I. Coughenour

[57] ABSTRACT

An axially moveable portable tool, such as a drill, and a guide for the tool are disclosed. The guide has a base with a post and a handle attached to and extending from the base. The post and handle are positioned so that a projection of the time of force applied during use to the tool grip and to the handle, both fall substantially within the base footprint. The upper extremity of the post can be provided with attachments that form parallel guide means or with angular sections that form a external guide for standard size and shaped portable tools. The portable tools can be easily attached to the post to assume a specific angle with the base and can be easily removed from it for independent use.

20 Claims, 3 Drawing Sheets

MULTI-USE TOOL GUIDE

CROSS-REFERENCE

This application is a continuation-in-part of applicant's prior U.S. Pat. No. 5,006,022 filed May 2, 1989 as Ser. No. 07/346,903 and issued Apr. 9, 1991.

BACKGROUND OF THE INVENTION

A portable hand tool guide is disclosed. These tools are relatively inexpensive to purchase and convenient to use. The two major problems encountered are the safety of the worker and accuracy of the work performed. To overcome these problems many solutions have been proposed. One of the most common proposals is attachments such as guides and supports for use with the tools. Most of these devices require that one or both hands be on the tool with no separate provision made for stabilization of the attachment. When a separate provision is made, such as a handle on the guide or support, it is usually necessary to balance the force applied to the tool.

It is common to have the line of force that is applied to the tool, and/or guide, project outside and beyond the guide base. This creates a clumsy hold and an overturning torque that tends to move the guide on the work and to prevent an accurate location of the area to be cut and maintenance of the guide at the area to be cut, and tends to preclude an accurate and constant angle for tool advancement. Examples are the patents to A. J. Daniels, U.S. Pat. No. 2,831,376 issued Apr. 22, 1958 and E. W. Purkey, U.S. Pat. No. 3,250,153 issued May 10, 1966. To balance this force or torque on the tool grip, handles have been added to the guide or support; A. C. Carles, U.S. Pat. No. 2,953,045, issued Sep. 20, 1960 and R. O. Hudson, U.S. Pat. No. 4,080,092, issued Mar. 21, 1978. Even when one of the forces on the tool or a handle is in line with the area encompassed by the base, the other is placed in opposition to that force or creates an undesirable torque with respect to it; J. P. Pufahl, U. S. Pat. No. 3,100,408, issued Aug. 13, 1963 and L. E. Pugsley, U.S. Pat. No. 3,107,556, issued Oct. 22, 1963.

When guideways are associated with tools they are often circular and either permit rotation of the tool about the guide or require two posts; L. J. Leitner et al, U.S. Pat. No. 2,837,939, issued Jun. 10, 1958 and I. J. Epstein, U.S. Pat. No. 4,279,552, issued Jul. 21, 1981. Those that are not circular are placed on the side of the tool or opposite the tool grip, reducing visibility and the ability of the tool to access areas such as corners; M. Van Praag, U.S. Pat. No. 3,242,773, issued Mar. 29, 1966 and G. C. Lipe, U.S. Pat. No. 3,746,460, issued Jul. 17, 1973. Non-circular posts, adjustable stops on posts, and graduations on posts, per se, are old in the art; A. T. Abell, U.S. Pat. No. 3,853,420, issued Dec. 10, 1974, N. A. Lopez, U.S. Pat. No. 2,050,709, issued Aug. 11, 1936, and A. Boyajian, U.S. Pat. No. 3,838,935, issued Oct. 1, 1974.

It is known to provide a tool with an external guide means with U.S. Pat. No. 4,765,786 issued Aug. 23, 1988 to Kris Krogh and to provide external recesses or grooves in a tool body for guiding a tool with U.S. Pat. No. 3,141,360 issued Jul. 21, 1964 additional examples.

SUMMARY OF THE INVENTION

The present invention is an improvement over the tool guides and supports of the prior art. The tool is provided with a guideway that is on the same side of the tool chuck centerline as the gripping means, so that visibility in the cutting zone, and the ability to access corners, is unimpaied. By the use of any shape non-circular guideway, rotation of the tool on the guide is precluded, assuring linear movement using only one post. The guide means is provided with a base, that supports a post in essentially the shape of the guideway of the tool, and a handle for location, placement and retention of the guide on the work before and during use of the tool. The handle is located and positioned on the base so that pressure applied to the base through it projects within the footprint defined by the area encompassed by the base. The post is located on the base so that the gripping means of the tool, when attached, moves with respect to the base in a line that falls within the footprint of the base. While not necessary, in the preferred embodiment, the post is perpendicular to the base. Even the novice can accurately position and make perpendicular cuts. By this arrangement, the handle permits one hand of the operator to locate the base on the work and press the base to the work while the other hand is free to advance the tool.

Both the force on the handle and the force on the gripping means add to press the base onto the work. For greater retention of the base on the work, the base can be provided with apertures used with attachment means such as screws or sharpened pins or friction feet or magnets. Any type surface from soft to hard flat material can be accurately worked on. Slots or other openings can be provided on one end or two sides of the base to receive slidable means for ajusting the angle at which the base rests on the work and thus the angle that the tool penetrates the surface worked on. The slots are also useful for adding other attachments to the base. Graduations can be placed on the post so that the depth of penetration can be observed. Adjustable slide stops can be placed on the post to mechanically limit penetration and give depth control. By use of the invention, the safety and accuracy of a conventional bench-mounted tool is approached while using inexpensive portable hand tools. The invention accomplishes the increased safety and accuracy with a simplified, relatively inexpensive, structure that can be made of commonly used materials. Since one hand is used to grip the tool and the other to guide it in a stable manner, the possibility of accident or injury is reduced. The non-circular configuration of the single post and guideway assures linear advancement of the tool. The material forming the slot, usually being weaker than that of the post, has its shape and dimensions protected due to its internal position.

The single internal guide requires a hand held tool with specific features. The advantages of the internal guide can be extended to conventional hand held tools by modification of the guide. The modification can be adjustable and used as either an internal or external guide. The guide means can be used by abutting the tool body proper or by fitting into depressions or recesses provided in the body proper or handle/grip of the hand tool. The post can be pivoted at its base or removed for easy shipping and storage or replacement. The base can be provided with magnets, for securing it to magnetic work that is to be cut. A spirit or bubble level can be provided to indicate the inclination of the base due to the surface supporting it.

DETAILED DESCRIPTION OF THE PREFERRED EMBODIMENT

Figure 1:
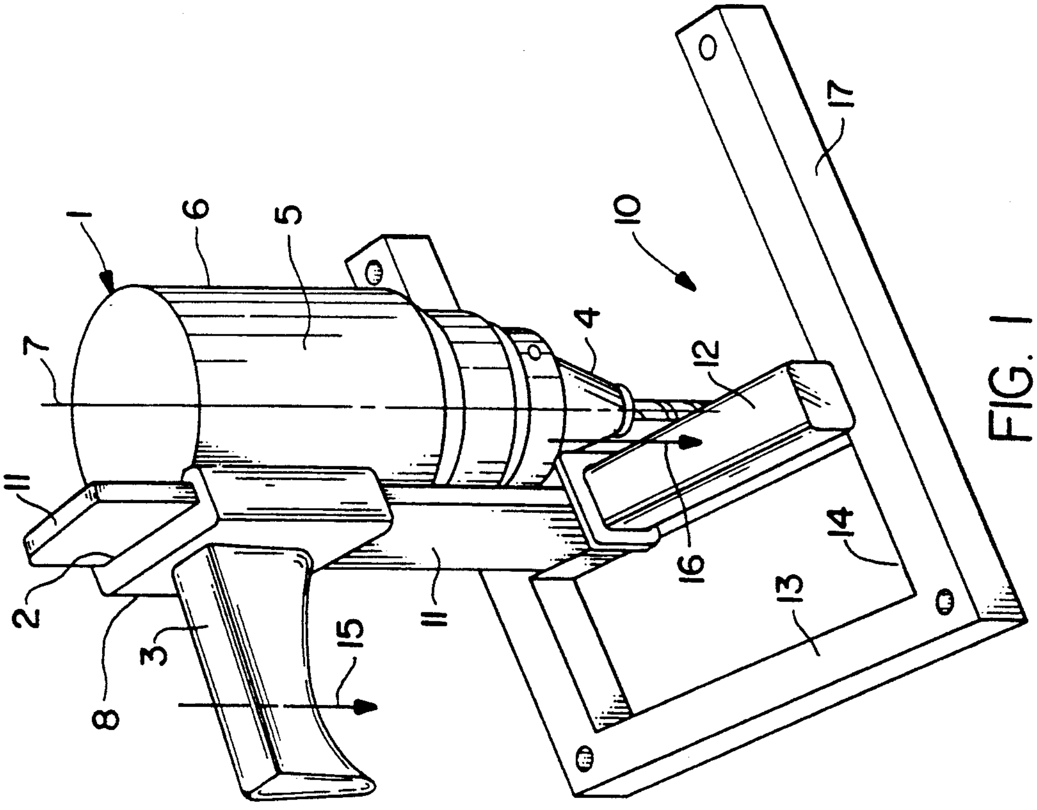
FIG. 1 is a perspective view of a tool with an internal guide positioned on a guide post.

In accordance with the present invention, a tool, such as a drill (1) shown in FIG. 1, is provided with an internal guideway (8) with a slot (2) on the same side of the tool chuck centerline (7) as the tool gripping means (3). Such positioning leaves the front (6) and sides (5) of the tool proper free from obstructions and the cutting means holder or chuck assembly of a drill (4) accessible for use of a drill key and permits unobstructed visibility in the cutting zone during use. The guideway slot (2) is parallel to the tool axis (7) so that the line of force (15) applied to the tool grip advances the tool toward and into the work at the angle determined by the positioning of the guide post.

As also shown, the guide means (10) consists of a base (13,17), a post (11), and a handle (12). The base with cross members (13) and spaced supports (17), can take any convenient configuration, such as spaced supports in the form of an H or an A with parallel legs or a U, etc., so long as the footprint or area encompassed is large enough to enclose the projection of the lines of force (15,16) applied to the handle and tool grip. The base shown has the spaced supports (17) positioned by base cross members (13) and is preferred because it can be used on narrow work such as 2×4's. The handle (12) can be positioned at any point within the footprint; it can project inwardly from any area on the periphery of the base or it can be fixed to the post. The lower end of the post (11) can be positioned at any point within the footprint of the base. In the preferred embodiment, the handle (12) is secured to the post (11). To have both the post and handle positioned reasonably close to the center of the footprint, the post is offset from the center of the base footprint. It can be seen that both the force (15) applied to the grip and force (16) applied to the handle, project within the footprint of the base (13, 17).

Figure 2:
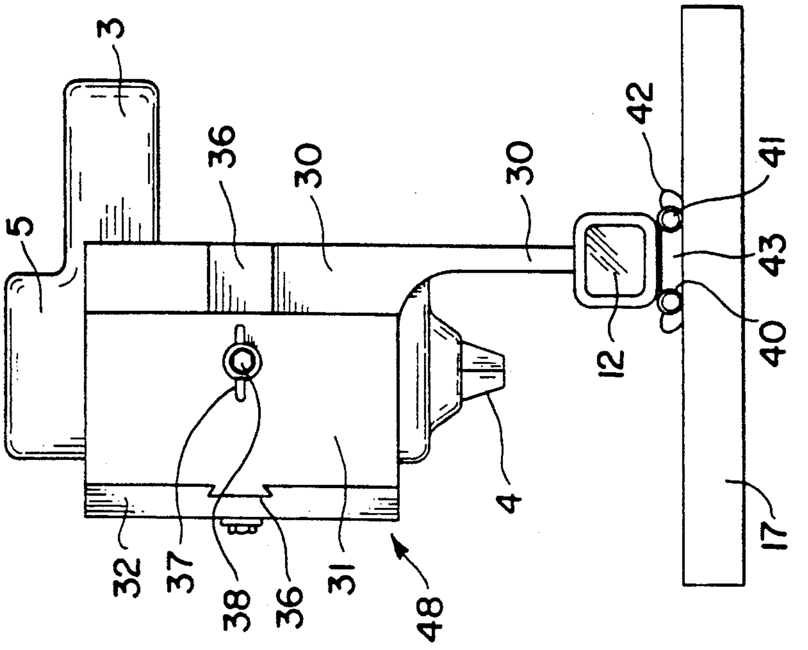
FIG. 2 is a side view showing an adjustable guide for external use hinged to the base with a tool inserted.
Figure 3:
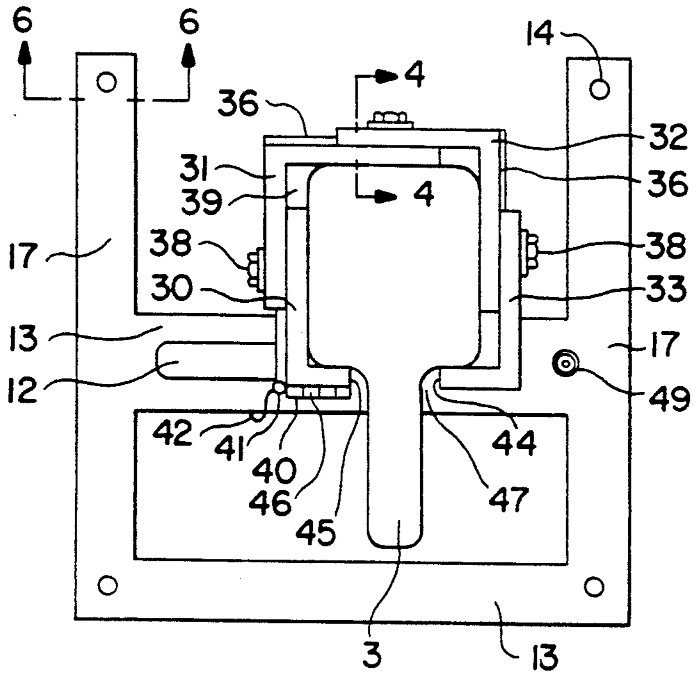
FIG. 3 is a top view of FIG. 2 showing the adjustable angle sections that form the guide with a tool inserted.
Figure 4:
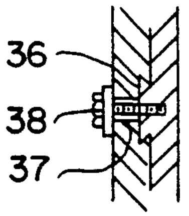
FIG. 4 is a sectional view taken along lines 4—4 of FIG. 3 showing the tongue and groove connection with securing means.
Figure 11:
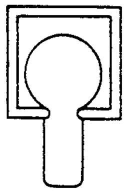
FIGS. 11-15 are simplified plan views depicting uses of the alignment means of FIGS. 2 and 3.
Figure 12:
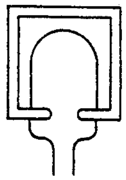
Figure 13:
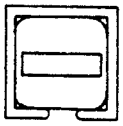
Figure 14:
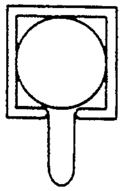
Figure 15:
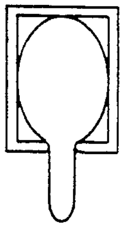

As best shown in FIGS. 2 and 3, the post or elongated guide attachment or extension (30) can be the support for the guide means (30-33) or can be a part of the guide means. The guide can be adapted to accommodate standard power tools for most of the common shapes and sizes, e.g. square, circular, oval, etc., and tools that are provided with depressions or recesses in the tool body proper or base portion of the handle/grip. The basic difference between the embodiment shown in FIG. 1 and that shown in FIGS. 2 and 3 is that the guide post (10) of FIG. 1 is for use as an internal alignment means while that (48) of FIGS. 2 and 3 is for use as an external alignment means. By adjusting the alignment means to a specific tool, the tool can be aligned time after time in the same location. In the embodiment of FIGS. 2 and 3, an elongated guide attachment or extension (30) is fixed to a plate (43). The upper extent of the guide attachment is provided with or becomes a first guide or angle section. Three other guide or angle sections (31, 32, 33) slidably engage each other and the elongated guide attachment angle section (30) to form an essentially rectangular or square internal configuration or open area or elongated internal opening (39) having parallel and perpendicular surfaces as shown in FIG. 3. While any desired securing means may be used, it is preferred that each angle section be slidably connected to the adjacent angle section by a tongue and groove connection (36) as shown in FIG. 4. Any one of the tongue and groove connections will give a stronger, more stable connection for keeping the angle sections in position. To secure the angle sections in place, an elongated aperture (37) is provided in the outer overlapping angle section. A fastening means, preferably a bolt (38), extends through the aperture (37) and is threaded into the tongue of the inner overlapping section to clamp the two together as the greatest thread area is present there. The four angle sections (30-33) can be adjusted to form an enclosed elongated open area (39) that will be a close fitting guide for any one of the common circular, oval, rectangular, square or other shape tools. A space or slit can be provided between the nonabutting end edges of the angle sections (30, 33) forming one side of the elongated internal opening (39). The slit permits a tool handle to protrude through while the tool proper is positioned within the open area provided by the angle sections. Once the angle sections are secured in the desired position to accommodate a specific tool, the tool can be removed and relocated in the exact same position time after time. FIGS. 3 and 13-15 in simplified form depict the guide means used with square, circular and oval tools. In FIG. 14 a square tool is shown with its handle in line with the tool axis. In addition to the standard shape power tools, many are provided with external guide means in the form of various shape depressions or recesses that can be in the tool body proper or handle/-grip. The end edges of the two angle sections (30, 33) can be formed into shaped edges (44, 45) of any desired configuration with the space between them forming an adjustable width slit (47). When these edges are used as guide means for the tool, it is not necessary that the tool fit closely within the open area (39) formed between the angle sections. FIGS. 11 and 12 depict in simplified form the guide means positioning a tool at the base of the handle and at the body proper respectively. By adjusting the spacing between the shaped edges (44, 45) of the two angle sections (30, 33), various recesses anywhere from the grip to within the body proper of the hand tool may be engaged for guidance.

To simplify storage and shipment of the guide means, the lower extremity of the elongated guide attachment (30) is fixed to a plate (43). The plate is fastened to the base along two edges using separable fastening means. Any type temporary connectors may be used. As shown in FIGS. 2 and 3, opposite edges of the plate and the adjacent base cross member (13) are fastened together with piano or door type hinge sections (40) provided on the plate and (46) on the base that are fastened together with a removable hinge pin (41) that is fixed to the cross member (13) by a wire or chain (42) to prevent loss. To swing the elongated guide attachment (30) essentially into the plane of the base, one of the hinge pins (41) is removed allowing the guide to be pivoted around the other hinge. To remove the guide from the base, both of the hinge pins (41) are removed.

Figure 7:
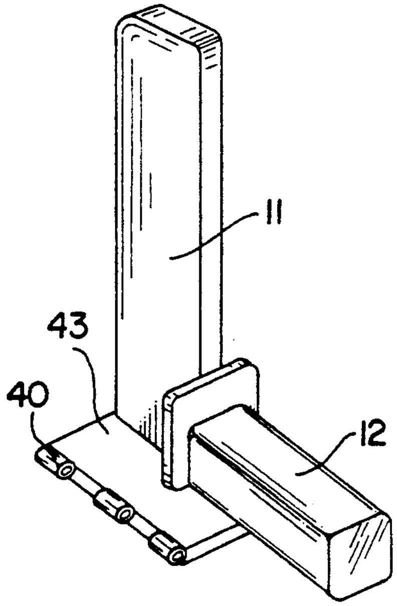
FIG. 7 is a perspective view of an internal guide post that can be removably attached to the base.
Figure 8:
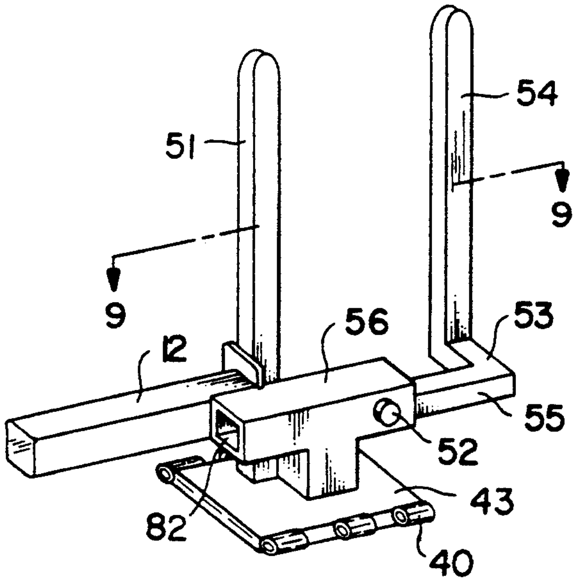
FIG. 8 is a perspective view of another adjustable guide means that can be used as an internal or external guide.
Figure 9:
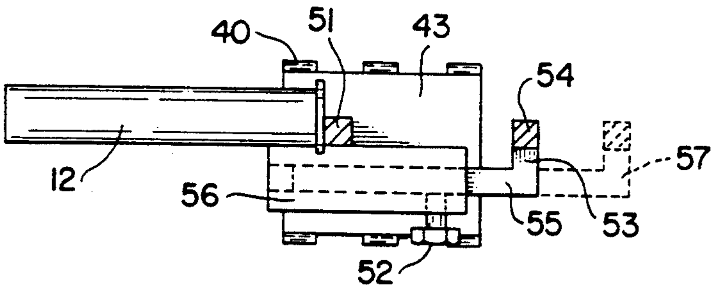
FIG. 9 is a sectional view taken along lines 9—9 of FIG. 8 in full lines and showing one guide rod extended in phantom lines.
Figure 10:
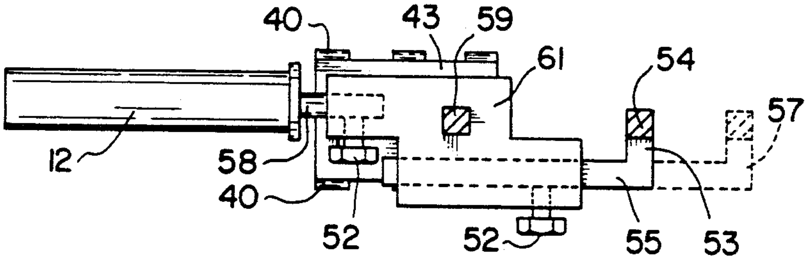
FIG. 10 is a sectional view of a modification of the guide of FIGS. 8 and 9 in full lines with one guide rod extended in phantom lines.
Figure 16:
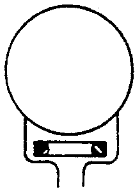
FIGS. 16-20 are simplified plan views depicting uses of the alignment means of FIGS. 8-10.
Figure 17:
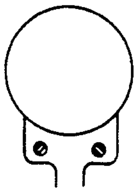
Figure 18:
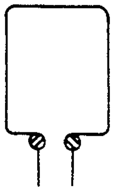
Figure 19:
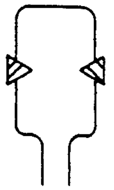
Figure 20:
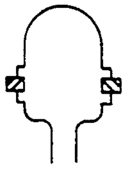

FIGS. 7-10 are examples of alternate guide means that may be fastened to the base using the connectors (40, 41, 46) provided in FIGS. 2 and 3. The guide means of FIG. 7 is the same as that shown in FIG. 1 provided with the removable plate means (43). The guide means of FIGS. 8-10 are provided with a plate (43) and hinge means (40) and two parallel guide posts in the form of rods. The rods are of any desired cross-sectional shape, round, square, etc. A first straight guide rod ( 51 or 59) can be fixed to the plate (43) or to attachment means shown as a slide block (56 or 61). The second guide rod is in the general shape of an "L" with the legs essentially perpendicular and slightly off-set. One leg of the "L" (55) slidingly and adjustably passes through a passage (82) in a slide block. The second guide rod is fastened in place in the passage (82) by a clamping screw (52) pressing against the leg (55) of the guide rod. The second leg (54) of the "L" extends essentially perpendicular to the leg (55) and upwardly parallel to the first guide rod. To keep the guide rods in line with each other and with the handle, the second guide rod is provided with an off-set (53). In FIG. 9, the attachment means slide block (56) is fixed directly to the plate (43). The first guide rod (51) is directly fixed to the slide block and optionally can also be fixed to the plate. The handle (12) is fixed to the first guide rod (51). In FIG. 10, the first guide rod (59) is fixed to the plate (43) and the attachment means slide block (61) is adjustably slidable on the guide rod (59) to which it is removably fastened by a clamp screw (not shown). The handle (12) is provided with an extension (58) that is removably fastened to the slide block (61) by a clamp screw (52). In both FIGS. 9 and 10 the first guide rods (51 or 59) cooperate with the second guide rods (54) to form an elongated guideway to position and guide hand tools that have either internal or external guideways or recesses in their handle or grip means or in their body proper. By selecting the proper cross section for the guide rod and carefully spacing the two guide rods (51 or 59 and 54), any of the tools with one or two internal slots can be used with the guide rods or any of the tools having external guideways or recesses in the handle or body proper can be used with the guide rods. Examples of such alternate uses are shown in simplified form in FIGS. 16-20. In FIG. 16 the two guide rods position and guide a tool having a single internal slot. In FIG. 17 the guide rods position and guide a tool having two internal slots. In FIGS. 18-20 the guide rods position and guide tools having external recesses at the base of the grip and in the tool body proper. All of the guide means provide an elongated guideway opening, shown at (39) and between (44) and (45) in FIG. 3 and between (51) and (54) in FIG. 8 and between (54) and (59) in FIG. 10. As can be seen in FIGS. 2,3,7,8,9 and 10, the guide means all have their upper extent unobstructed for tool insertion into or onto and removal from the guide means.

Figure 5:
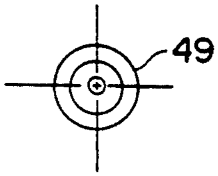
FIG. 5 is a close-up view of the bubble level.
Figure 6:
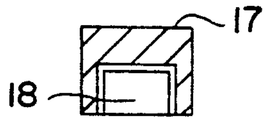
FIG. 6 is a sectional view taken along lines 6—6 of FIG. 3 showing a magnet inserted in the base.

It is often desirable that the hole drilled be perpendicular. To indicate that the base (13, 17) is level, a spirit or bubble level (49) is provided in the base. The level means (49) is shown in FIGS. 3 and 5. To provide adhesion of the base to the work when a ferrous or magnetic material is being cut, the base can have magnets permanently or temporarily inserted in the corners, and at any other desired location. One such magnet (18) is shown in FIG. 6.

It is believed that the construction, operation and advantages of this device will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

What is claimed is:

1. A hand-held guide means for use with hand-held tools comprising:
   - spaced supports forming a base;
   - a first guide supported by said base;
   - a second guide, an attachment means supported by said base by which said second guide is adjustably fastened to said base;
   - a second guide clamping means for releasably clamping said second guide after adjusting the space between said first guide and said second guide by said attachment means;
   - said first guide and said second guide and said attachment means being fastened together with said first guide and said second guide parallel to each other and unobstructed throughout their upper extend to form an elongated guideway so that different size and shape hand held tools can be placed between or over said first guide and said second guide to be guided in a fixed path defined by said elongated guideway.

2. The tool guide as defined in claim 1 wherein said attachment means is a slide block and said second guide includes perpendicular legs with one leg extending toward and adjustably clamped to said slide block a distance above said base and a second leg extends parallel to said first guide.

3. The tool guide as defined in claim 1 wherein said first guide is a rod and said attachment means is a slide block fixed with respect to said first guide rod and said second guide is a rod with perpendicular legs with one of said perpendicular legs slidably and adjustably clamped within a passage in said slide block and a second leg of said second guide rod extends parallel to said first guide rod so that the spacing between said first guide rod and said second guide rod second leg can be spaced to accommodate different size tools.

4. The tool guide as defined in claim 1 wherein said attachment means is an elongated guide extension with an angle section that forms said first guide and said second guide is formed by other angular sections fastened to said first guide, said angular sections forming an elongated internal opening with sides parallel and perpendicular to each other such that the exterior surfaces of said hand-held tool to be guided will slidingly abut said elongated internal opening sides.

5. The tool guide as defined in claim 4 wherein said angular sections are adjustable with respect to one another to vary said elongated internal opening size and shape to accommodate different size and shape hand-held tools.

6. The tool guide as defined in claim 5 wherein said angular sections are adjusted by sliding one relative to another using tongue and groove connections that are clamped in selected positions by bolts that pass through slots into threaded apertures in adjacent angular sections.

7. The tool guide as defined in claim 4 wherein two of said angle sections have nonabutting ends that form a slit through which the handle of said hand-held tool can protrude to apply force to said tool while said tool exterior surfaces abut and are guided by said parallel and perpendicular sides forming said elongated internal opening.

8. The tool guide as defined in claim 1 wherein an elongated guide extension on said first guide functions as said attachment means and said first and said second guides are formed by angular sections with said second guide angle sections secured to said first guide angle section such that one edge of said first guide angle section and one edge of said second guide angle sections each have shaped edges forming said elongated guideway opening between which recesses in said hand-held tools are guided.

9. The tool guide as defined in claim 1 wherein said base is provided with connector means that permit said first guide, said second guide and said attachment means to be fastened to said base for use or pivoted on said base for shipment or storage or removal from said base.

10. The tool guide as defined in claim 1 wherein said elongated guideway is formed by having said first guide and said second guide in the shape of recesses provided in said hand-held tools to be used.

11. The tool guide as defined in claim 1 wherein said supports of said base have magnet inserts for assisting in maintaining the position of said base on work that is a magnetic material.

12. The tool guide as defined in claim 1 wherein said base is provided with a level means to indicate the angle of inclination of said base.

13. A hand-held guide tool as defined in claims 1 wherein said first guide and said attachment means are fixed to a plate that is fastened to said base.

14. A hand-held guide for use with a hand-held tool comprising:

a base having elongated spaced supports joined together with a cross member, the underside of said spaced supports having exposed coplanar surfaces for supporting said guide on material to be cut, the area between said spaced supports defining a footprint and an extensive open area for viewing said material and passage of said tool;

an attachment means supported by said base;

a first guide supported by said base;

a second guide adjustably fastened to said base by said attachment means and extending parallel to said first guide;

a second guide clamping means for releasably clamping said second guide after adjustably positioning said second guide and the space between said first guide and said second guide to form an elongated guideway for different size and shape hand held tools;

a handle attached to said base between said spaced supports;

said handle and said first guide and said second guide being positioned above said footprint so that the line of force applied to said handle and the line of force applied to any tool supported on said first guide and said second guide are directed toward said base so that both lines of force will pass within the area defined by said footprint.

15. The tool guide as defined in claim 14 wherein said elongated guideway is formed by angular sections fastened together to provide an elongated opening with four sides of parallel and perpendicular surfaces that are essentially the size of the body proper of said hand-held tool.

16. The tool guide as defined in claim 15 wherein one of said four sides has an elongated slit through which a grip of said hand-held tool can pass.

17. The tool guide as defined in claim 15 wherein said angle sections have tongue and groove connections slidable with respect to one another so as to adjust the size and shape of said elongated opening to accommodate different size and shape hand-held tools.

18. The tool guide as defined in claim 14 wherein said tool guide is provided with connector means to fasten said first guide, said second guide and said adjustment means to said base.

19. The tool guide as defined in claim 18 wherein said connector means includes a plate having edges with hinge pin receiving means provided on two opposite edges and removable hinge pins to optionally pivot said first and said second guides and said adjustment means on said base by removing one pin or to optionally remove said first and said second guide and said adjustment means from said base by removing both pins for transport, storage or replacement by a different shape guide means.

20. The tool guide as defined in claim 14 wherein said first guide is a straight rod and said second guide is an a rod with perpendicular legs having one leg extending toward said first rod and clamped within a passage in said attachment means and a second leg extending parallel to said first rod.

* * * * *